United States Patent [19]

Iwasa et al.

[11] Patent Number: 5,560,724
[45] Date of Patent: Oct. 1, 1996

[54] KEYBOARD HAVING IMPROVED KEYTOP

[75] Inventors: Seiichi Iwasa; Hideyuki Motoyama; Makoto Yoshioka, all of Kawasaki, Japan

[73] Assignee: Fujitsu Limited, Kawasaki, Japan

[21] Appl. No.: 488,674

[22] Filed: Jun. 7, 1995

Related U.S. Application Data

[62] Division of Ser. No. 21,227, Feb. 23, 1993, Pat. No. 5,486,059.

[30] Foreign Application Priority Data

Feb. 27, 1992 [JP] Japan ................................ 4-041582

[51] Int. Cl.$^6$ ........................................................ B41J 5/08
[52] U.S. Cl. ........................... 400/488; 400/490; 400/495
[58] Field of Search ................................ 400/488–496

[56] References Cited

U.S. PATENT DOCUMENTS

| | | | |
|---|---|---|---|
| 722,006 | 3/1903 | Fox | 400/490 |
| 2,052,616 | 9/1936 | Gardes | 400/495 |
| 2,285,963 | 6/1942 | Gits et al. | 400/490 |
| 2,615,548 | 10/1952 | Hopkins et al. | 400/495 |
| 3,464,531 | 9/1969 | Herr et al. | 400/481 |
| 3,945,482 | 3/1976 | Einbinder | 400/488 |
| 4,512,092 | 4/1985 | McLaughlin et al. | 40/2 R |
| 4,641,723 | 2/1987 | Takanashi et al. | 180/315 |
| 4,830,526 | 5/1989 | Hosono | 400/472 |
| 4,974,183 | 11/1990 | Miller | 400/488 |
| 5,017,030 | 5/1991 | Crews | 400/485 |
| 5,032,698 | 7/1991 | Satoh | 200/341 |
| 5,391,006 | 2/1995 | Danziger | 400/488 |

FOREIGN PATENT DOCUMENTS

| | | | |
|---|---|---|---|
| 0461529 | 12/1991 | European Pat. Off. . | |
| 2202821 | 8/1973 | Germany | 400/488 |
| 9014472 | 1/1991 | Germany . | |
| 58-133843 | 9/1983 | Japan . | |
| 59-067069 | 4/1984 | Japan . | |
| 60-023067 | 2/1985 | Japan . | |
| 62-022129 | 1/1987 | Japan . | |
| 64-043437 | 3/1989 | Japan . | |
| 1-129317 | 5/1989 | Japan . | |
| 1-072631 | 5/1989 | Japan . | |
| 1-213921 | 8/1989 | Japan . | |
| 2-297104 | 12/1990 | Japan . | |
| 64951 | 7/1913 | Switzerland | 400/491.2 |
| 700083 | 11/1953 | United Kingdom | 400/488 |
| 932856 | 7/1963 | United Kingdom . | |
| 3441614 | 7/1985 | United Kingdom . | |

OTHER PUBLICATIONS

Conway, D. L., "Contoured Keyboard," *IBM Technical Disclosure Bulletin,* vol. 22, No. 3, Aug. 1979, pp. 1276–1277.

*Primary Examiner*—Eugene H. Eickholt
*Attorney, Agent, or Firm*—Staas & Halsey

[57] ABSTRACT

A keyboard includes a keyboard body, a plurality of keys arranged in rows and columns, and switching elements for turning switching elements ON and OFF in response to operations on the plurality of keys. A special key among the plurality of keys has a keytop which is at least a stroke length of the special key higher than keytops of keys arranged in a row in which the special key is located.

8 Claims, 18 Drawing Sheets

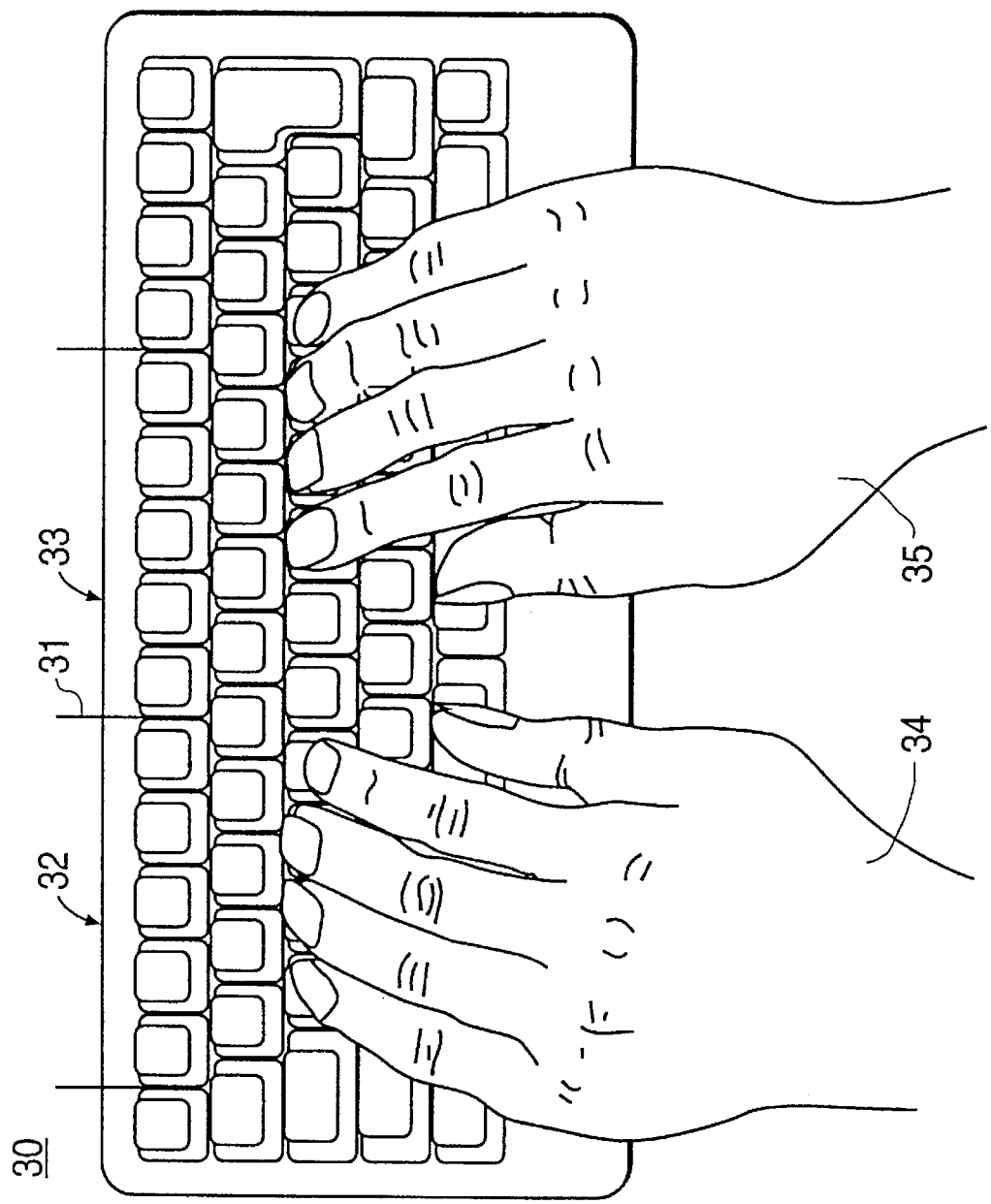

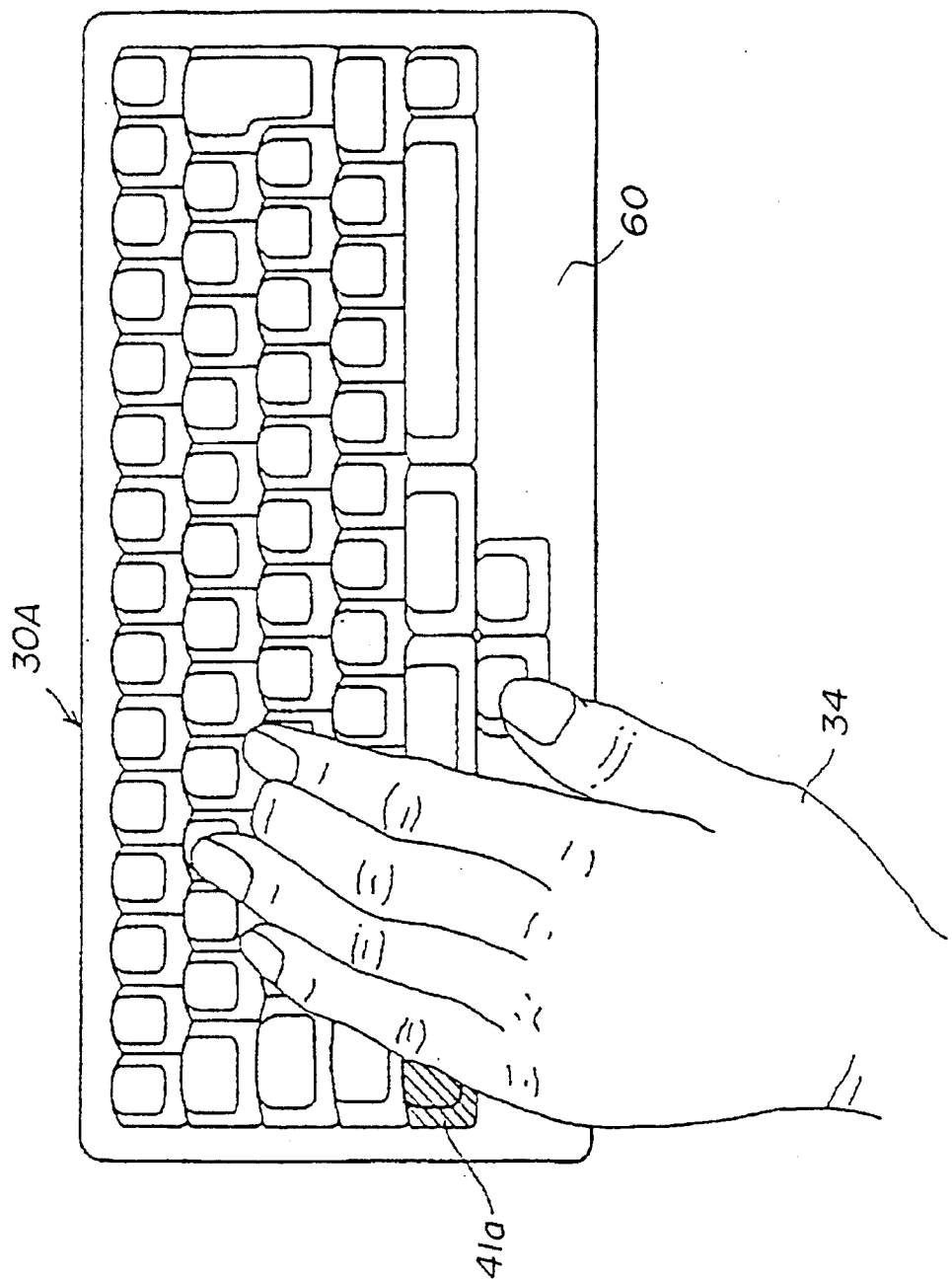

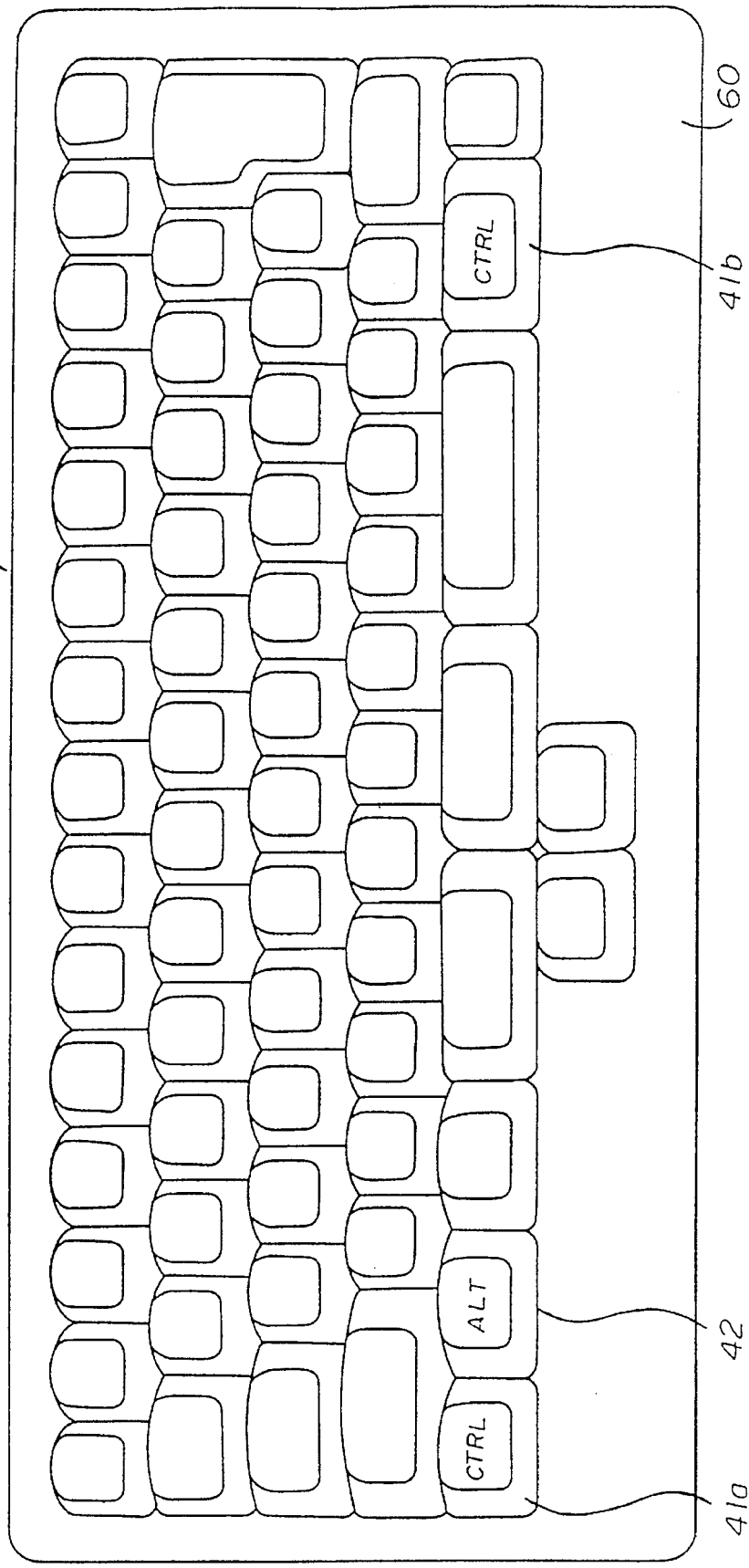

KEYBOARD HAVING IMPROVED KEYTOP

This application is a division of application Ser. No. 08/021,227, filed Feb. 23, 1993, now U.S. Pat. No. 5,486,052.

BACKGROUND OF THE INVENTION

1. Field of the Invention

The present invention generally relates to keyboards, and more particularly to a keyboard used for data entry in electronic devices.

2. Description of the Prior Art

Keyboards having a plurality of switching elements are used to transfer information based on the intents of operators to computers or other electronic devices. Recently, with the spread of OA (Office Automation) devices, it has been desired to improve the operationability of keyboards.

Generally, keyboards have a plurality of switching elements, each element including a switch member, a keytop and an electronic circuit. The switch member includes an electric contact, which completes or breaks the electric circuit. The keytop receives a depression force by the operator and transfers it to the switch member. The electric circuit generates a code of a character or symbol corresponding to the keytop depressed by the operator, and transfers it to a CPU (Central Processing Unit).

Switch member types include a lead switch, a mechanical switch, a membrane switch or a conductive rubber switch. Currently, the membrane switch is most widely used.

FIGS. 1A, 1B and 1C illustrate the structure of a conventional membrane switch. The membrane switch 10 includes an upper sheet 11, a spacer 12, and a lower sheet 13. The upper sheet 11 and the lower sheet 13 respectively have films 14a and 14b made of polyester. Circuit patterns 15a and 15b and contacts 16a and 16b are formed on the films 14a and 14b by ink containing Ag (silver) or C (carbon). As shown in FIG. 1B, a spacer 12 is sandwiched between the films 14a and 14b, and has an opening located at a contact area where the contacts 16a and 16b face each other. As shown in FIG. 1C, the upper sheet 11 is depressed and the upper contact 16a comes into contact with the contact 16b. Thereby, the switching element is turned ON.

FIG. 2 shows a conventional keytop mechanism 20, which is made up of support panel 21, a housing 22, a slider 23, a keytop 24, and two springs 25 and 26. The support panel 21 is formed with a metal plate such as iron. The housing 22 is provided on the upper surface of the membrane switch 10 formed on the support panel 21. The slider 23 is inserted into the housing 22. The keytop 24 drives the slider 23. The springs 25 and 26 are arranged outside and inside of the housing 22, respectively, and cause the keytop 24 to return to the original position at which the switching element is OFF.

Using the two springs 25 and 26, it is possible to turn the switching element ON before the keytop 24 is completely depressed. In this case, a comfortable feel to the key operation can be obtained. The slidable distance of the slider 23 is defined as the stroke length. Normally, a stroke length of 3–4 mm is said to provide a comfortable feel to key operation. More particularly, when the keytop 24 is pushed down, the spring 26 is pressed against the membrane switch 10. The contact 16a comes into contact with the contact 16b when the keytop 24 reaches a suitable position and before the keytop 24 is completely depressed, that is, before the keytop 24 is pushed down to the deepest position.

A description of the electric circuit of the keyboard will be omitted because it is not directly concerned with the present invention.

There are many arrangements of keys. In Japan, several "kana"-key arrangements have been used. For example, the JIS (Japanese Industrial Standard) and the new JIS prescribe "Kana"-key arrangements. A thumb shift keyboard proposed by Fujitsu Limited has a "kana"-key arrangement. The so-called QWERTY arrangement is widely used as an alphanumeric key arrangement.

FIGS. 3A and 3B illustrate the above-mentioned thumb shift keyboard 30. The left area with respect to a center line 31 has character keys and digit keys arranged in four rows and five columns, and special keys (sometimes called function keys) arranged in the fifth row including the "CTRL" key and the "ALT" key. The right area with respect to the center line 31 has character keys and digit keys arranged in four rows and five columns, and special keys and a space key arranged in the fifth row. Further, two function keys are arranged in the sixth (lowermost) row. The keys arranged in a right-hand area 33 indicated by hatching are touched by the fingers of the right hand.

FIG. 4 illustrates how the keyboard 30 shown in FIGS. 3A and 3B is operated by the operator. The fingers of the right and left hands are located at the home position of the keyboard 30. Generally, the well-experienced operator can correctly operate the keys in the right and left hand areas without seeing the labels on the keytops. In light of the above, the right and left hand areas are called blind-touch areas. At the home position, the index finger and the little finger of the left hand are placed on the "F" and "A" keys in the left-hand area, respectively, and the index finger and the little finger of the right hand are placed on the "J" and ";" keys in the right-hand area. Generally, projections are formed on the keytops "F", "A", ";" and "J" in order to distinguish these keys from the other keys.

The keytops are depressed by the corresponding fingers. The "space" key and the "shift" keys are operated with the side portions of the thumb s. The heights of the keytops are designed to allow depression of the keytops by the tips of the fingers without difficulty. More particularly, the envelope connecting the keytops located between the first and sixth rows is curved so that the heights of the keytops gradually increase with respect to a base height (for example, that of the sixth row) increase from the side of the operator. There are known a slope type, a step type and a sculpture type of envelope arrangements. The keytops located in the same rows have the same height as each other.

The applicants are aware of the following documents. Japanese Laid-Open Utility Model Publication No. 58-133843 discloses a keyboard having special keys added to the conventional key arrangement. The cross-sections of the special keys are curved and operated with the side portions of the palms of the hands. The special keys are used to switch the operation modes.

Japanese Laid-Open Patent Publication No. 59-67069 discloses a keyboard having a special key added to the conventional key arrangement. The special key can be operated by the side portion of the palm of the left or right hand in a state in which the fingers are located at the home position.

U.S. Pat. No. 5,017,030 discloses a newly designed keyboard having keys operable with the fingers of the hands kept open. It is to be noted that the keyboards disclosed in the above documents are not conventional, and the components, such as a housing or membrane sheet, must be newly designed.

U.S. Pat. No. 4,512,092 discloses replacement labels for a keyboard in which labels on the keytops are easily replaceable.

Japanese Laid-open Patent Publication No. 62-22129 discloses a keyboard having special keytops higher than other keytops. The keyboard disclosed in this document is intended to realize key operation in a state in which the wrists can at rest. The special keytops are arranged at the thumb sides inside pedestals on which the writes are rest. Further, the special keys are disposed at a level other than levels of the other keys, and are operated by chips of the thumb fingers.

The conventional keyboards, such as thumb shift keyboards, have some difficulties in key operation, particularly for programming and producing documents or files. Nowadays, programming or making documents or files is carried out using an editor. Many available editors use combinations of a special key (for example, "CTRL" (control) key) and alphanumeric keys. These key combinations make it possible to input the same operations or instructions as those specified by special keys located outside of the blind-touch areas.

For example, when an alphanumeric key is operated while the "CTRL" key is being depressed, the following operations on movement of the cursor are input: (CTRL)+E=↑, (CTRL)+S=←, (CTRL)+X=↓, (CTRL)+D=→. Further, the combination of the "CTRL" key and the "G" key specifies a delete function, and the combination of the "CTRL" key and the "C" key specifies a scroll.

FIGS. 5 and 6 show how the keyboard (thumb shift keyboard) is operated in the above-described manner. More particularly, FIGS. 5 and 6 show how the "CTRL" key located at the lower left corner and the "D" key are operated. In FIG. 5, the "CTRL" key is operated by the index finger of the left hand, and the "D" key is operated by the index finger of the right hand. In FIG. 6, the "CTRL" key and the "D" key are respectively operated by the little and index fingers of the left hand. However, the operations shown in FIGS. 5 and 6 are not natural and easy.

SUMMARY OF THE INVENTION

It is a general object of the present invention to provide a keyboard in which the above disadvantages are eliminated.

A more specific object of the present invention is to provide a keyboard having improved key operationability, particularly, when two keys are simultaneously depressed.

The above objects of the present invention are achieved by a keyboard comprising: a keyboard body; a plurality of keys arranged in rows and columns; and switching means, coupled to the keys, for turning switching elements ON and OFF in response to operations on the plurality of keys, a special key among the plurality of keys having a keytop which is at least a stroke length of the special key higher than keytops of keys arranged in a row in which the special key is located.

The above objects of the present invention are also achieved by a keyboard comprising: a keyboard body; a plurality of keys arranged in rows and columns; and switching means, coupled to the keys, for turning switching elements ON and OFF in response to operations on the plurality of keys, m special keys (m≧1) among the plurality of keys having keytops which are at least a stroke length of the m special keys higher than keytops of keys arranged in a row in which the m special keys are located.

BRIEF DESCRIPTION OF THE DRAWINGS

Other objects, features and advantages of the present invention will become more apparent from the following detailed description when read in conjunction with the accompanying drawings, in which:

FIG. 4 is a diagram illustrating a home position;

FIG. 9 is a top view illustrating how the "CTRL" key and an alphanumeric key are concurrently operated;

FIG. 10A is a top view of a keyboard according to a variation of the first embodiment of the present invention;

DESCRIPTION OF THE PREFERRED EMBODIMENTS

Figure 1A:
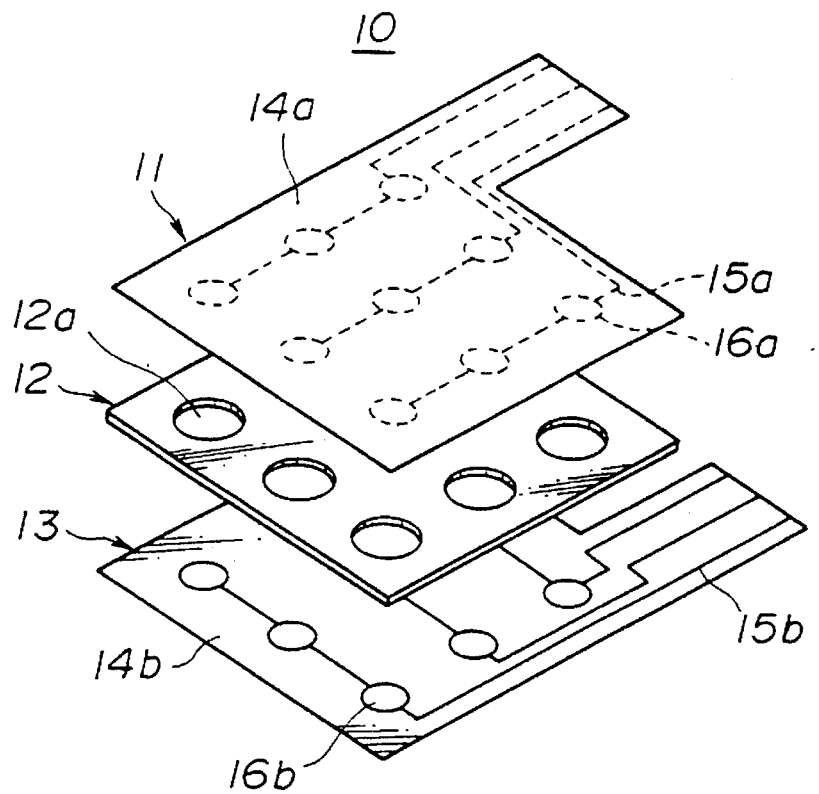
FIGS. 1A, 1B and 1C are diagrams illustrating a membrane switch.
Figure 1B:
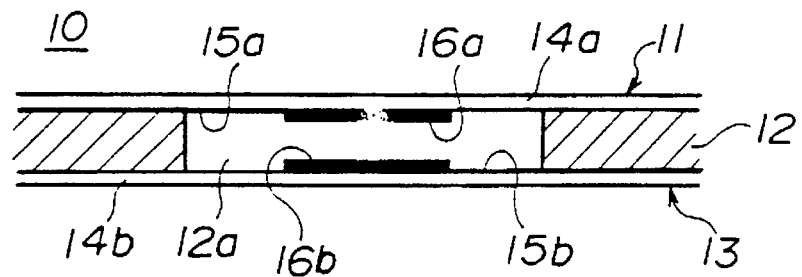
Figure 1C:
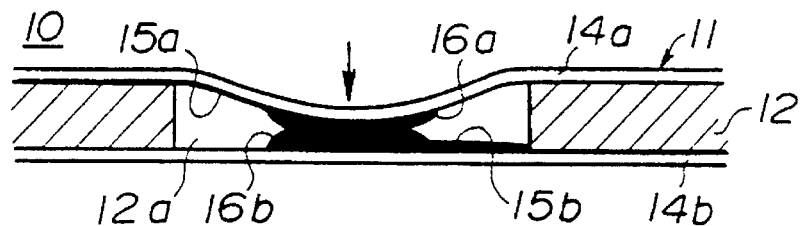
Figure 2:
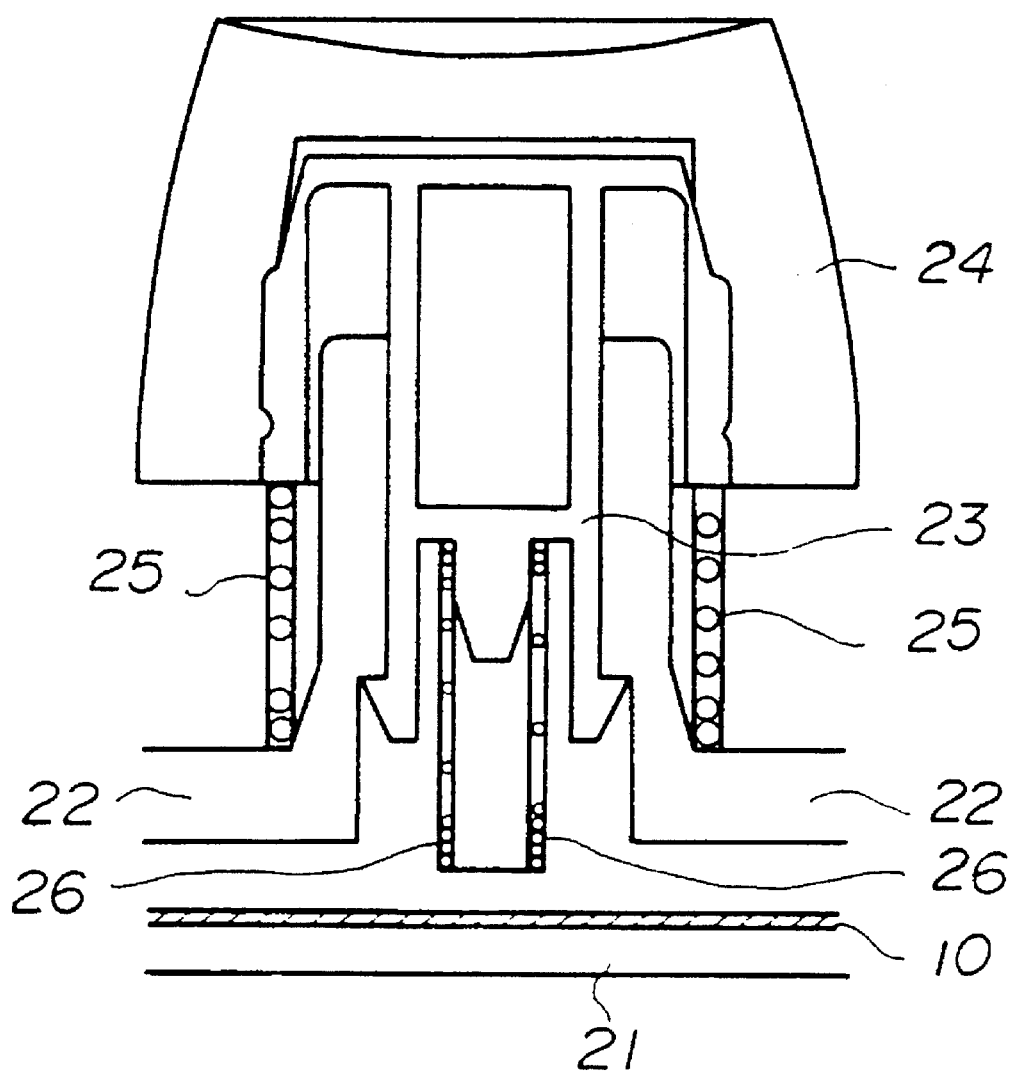
FIG. 2 is a diagram illustrating a keytop structure.
Figure 3A:
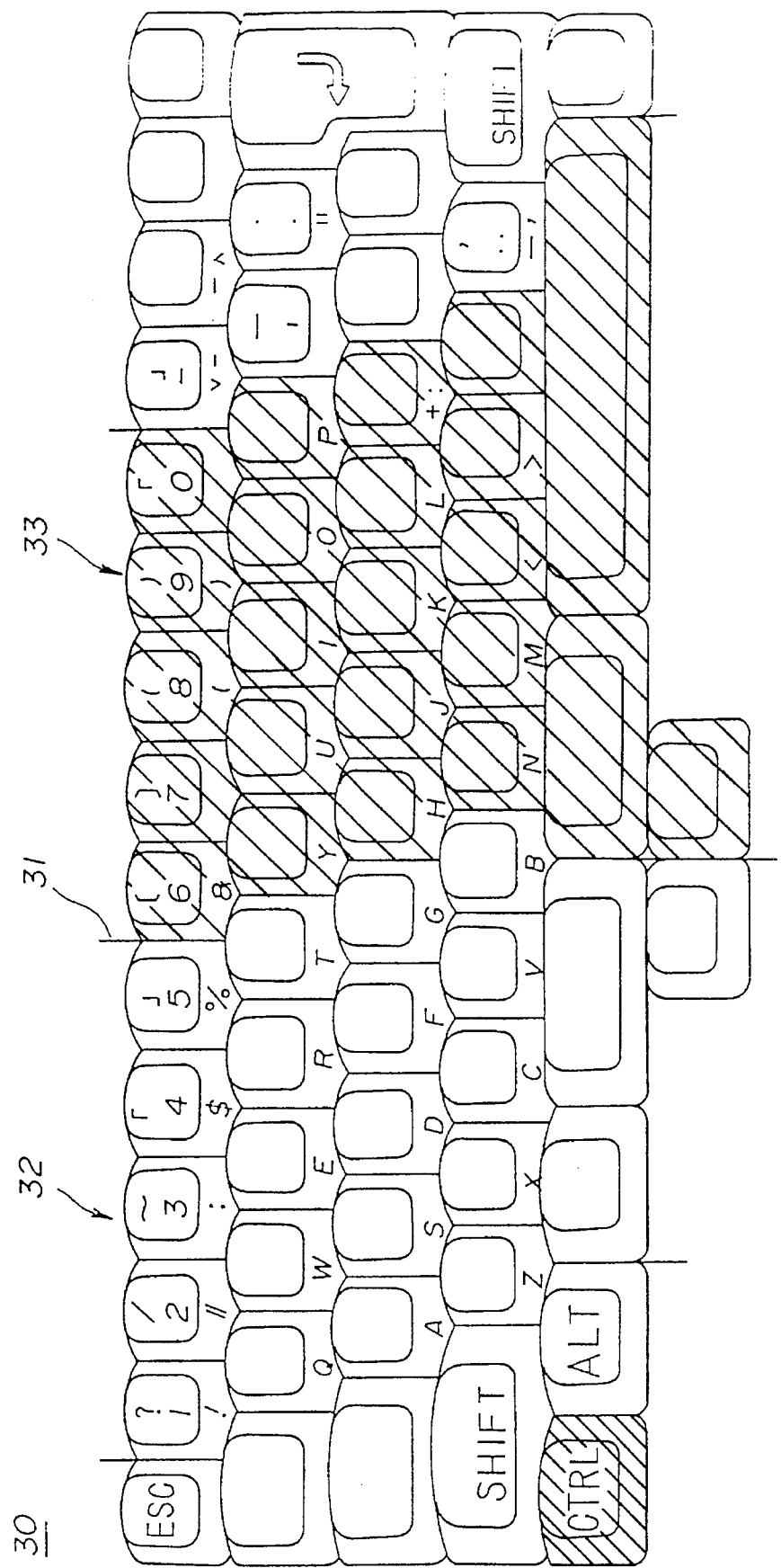
FIGS. 3A and 3B are diagrams illustrating a conventional key arrangement of a thumb shift keyboard.
Figure 3B:
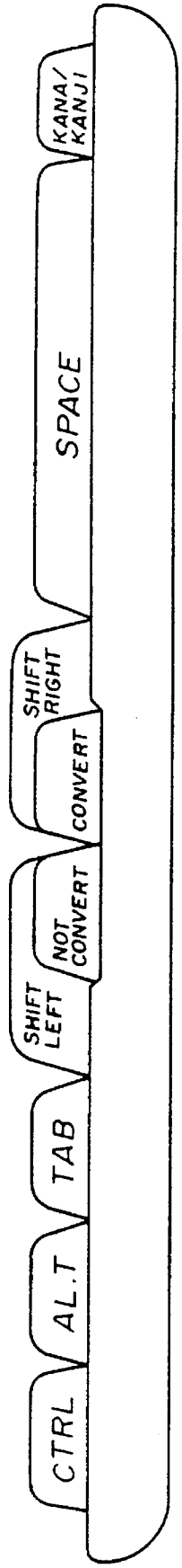
Figure 5:
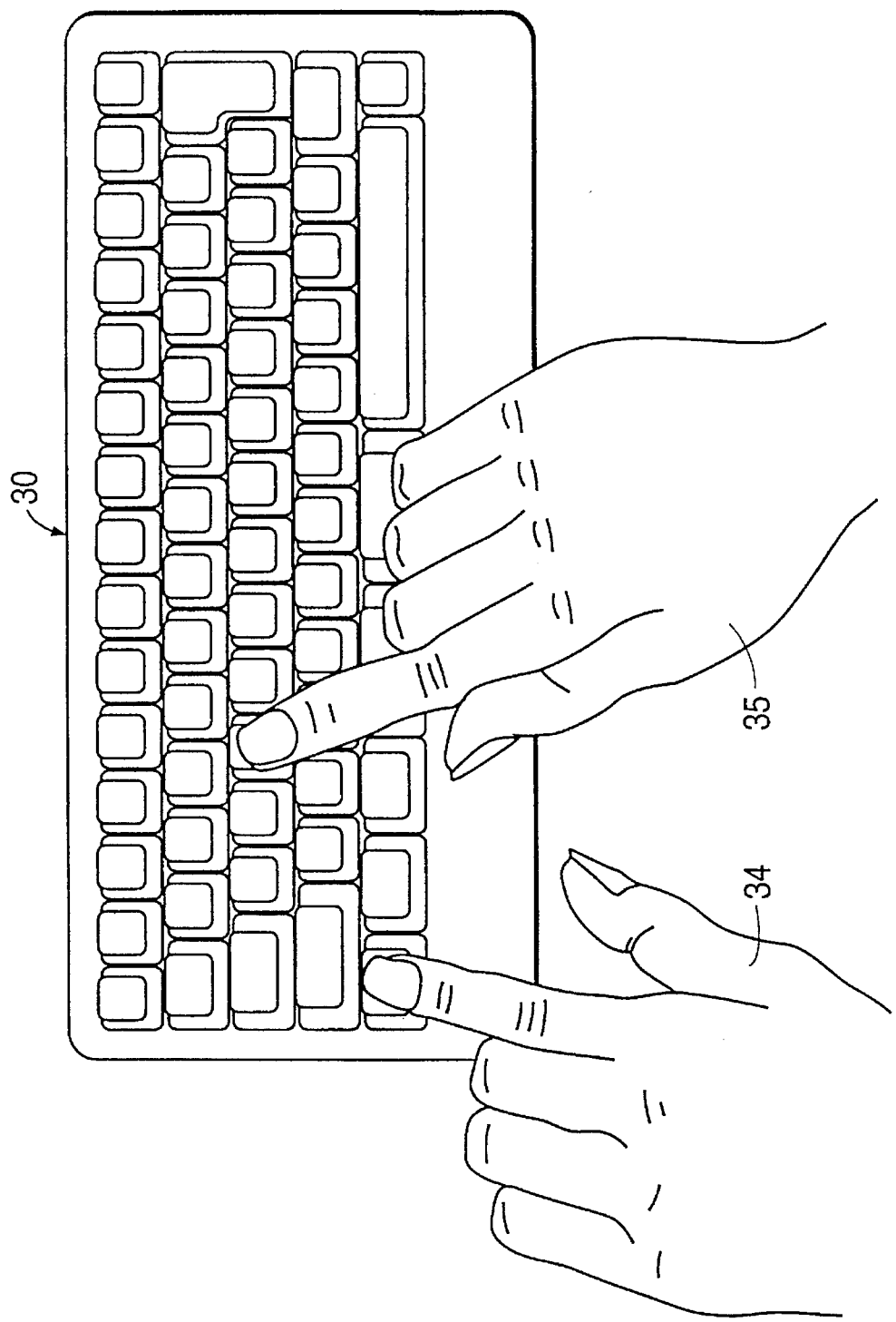
FIGS. 5 and 6 are diagrams illustrating how keys are simultaneously operated.
Figure 6:
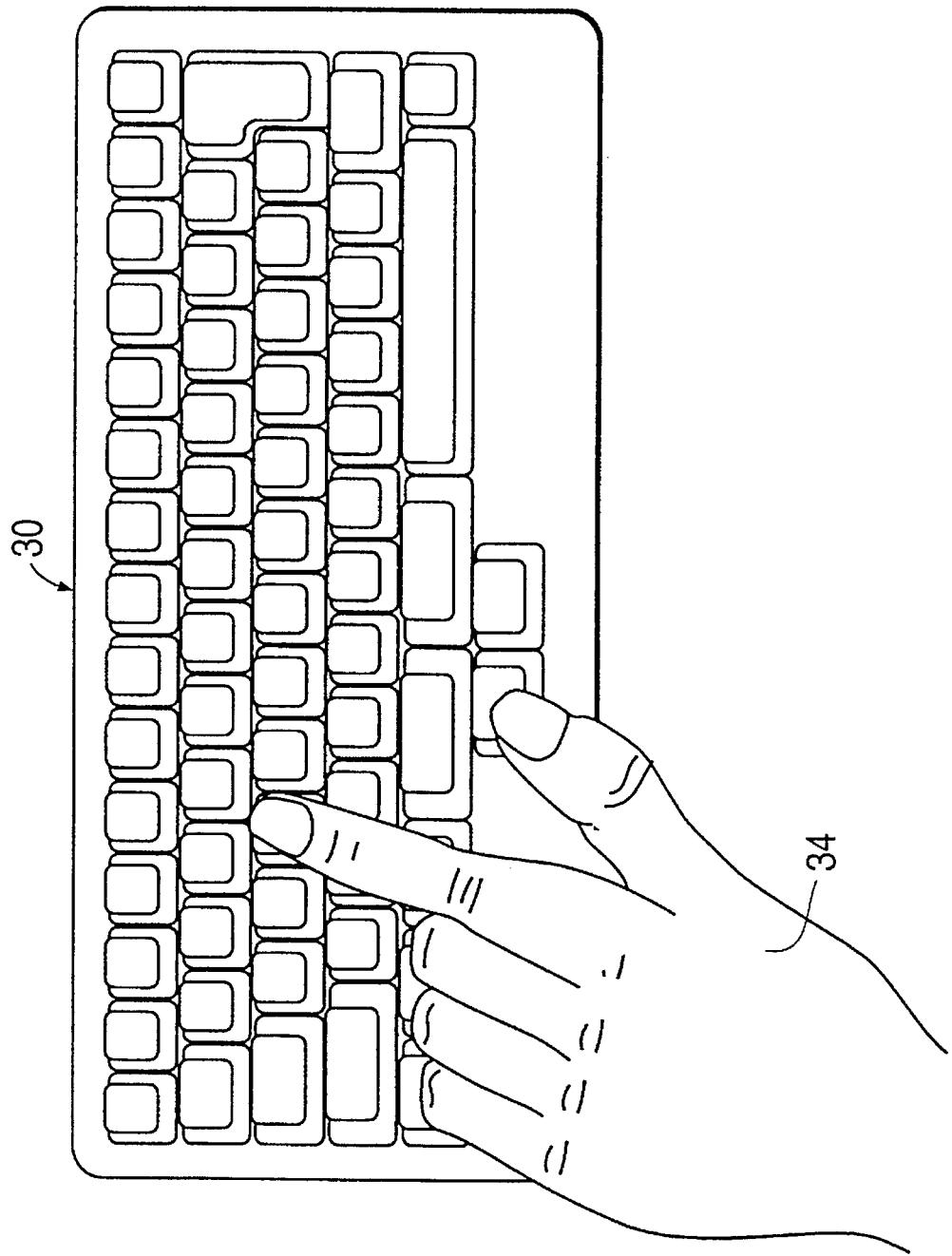
Figure 7:
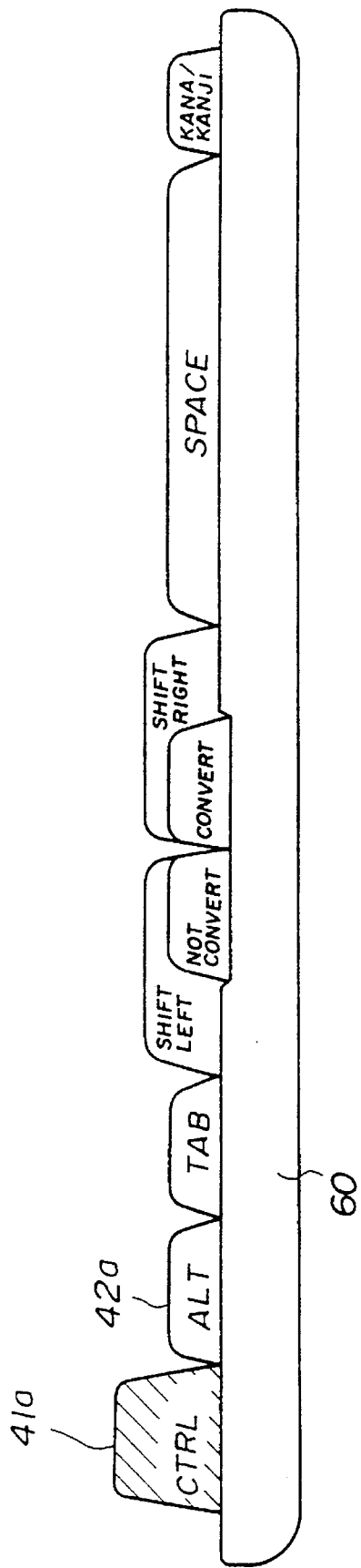
FIG. 7 is a front view of a keyboard according to a first embodiment of the present invention.

FIG. 7 is a front view of a keyboard 30A according to a first embodiment of the present invention. The keyboard 30A has the same key arrangement as the keyboard 30 shown in FIGS. 3A and 3B. The "CTRL" key indicated by reference number 41a is located at the lower left corner of the key arrangement in the same manner as the keyboard 30. The "CTRL" key 41a has an improved keytop. More particularly, the keytop 41a of the "CTRL" key 41a, which is integrally formed of a material, is at least a stroke length higher than the keytops of the other keys, such as an "ALT" key 42a and shift keys, arranged in the same row as the "CTRL" key 41a. When the "CTRL" key moves by the stroke length, the corresponding switch is turned ON. The operator can easily identify the "CTRL" key. Further, the operator can turn ON the "CTRL" key even if the "CTRL" key 41a is imprecisely operated, because the keytop of the "CTRL" key 41a is higher than that of the "ALT" key 42a. A reference number 60 indicates the body of the keyboard 30A. The keyboard 30A has a structure similar to that shown in FIGS. 1A, 1B and 1C.

Figure 8:
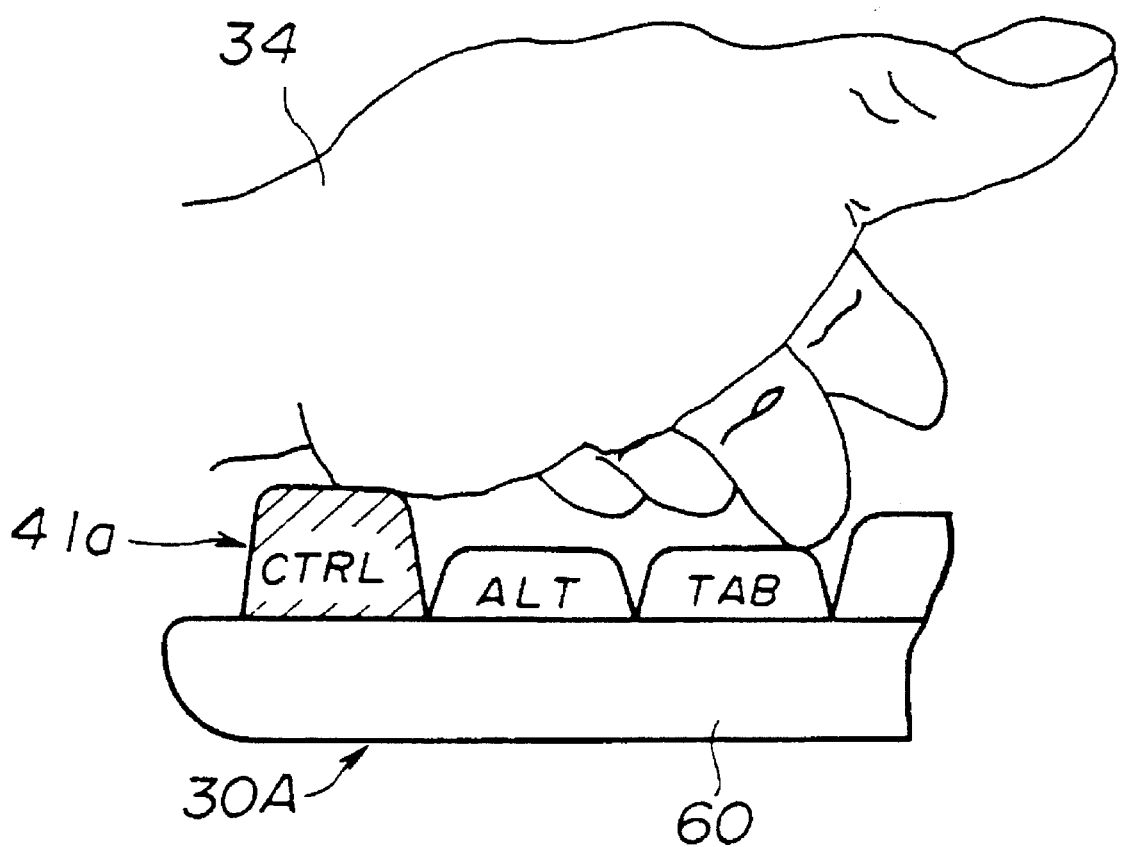
FIG. 8 is a front view illustrating how a "CTRL" key is operated.

As shown in FIG. 8, the "CTRL" key 41a can be operated using the root portion, or its vicinity, of the little finger of the left hand 34 or the side portion of the palm thereof. As shown in FIG. 9, the "CTRL" key 41a can be operated with the root portion, or its vicinity, of the little finger of the left hand while the left hand is placed at the home position. At the same time as above, the "D" key can be operated with the middle finger of the left hand 34. In the above manner, data or command entry based on the combination of the "CTRL" key and an alphanumeric key can be easily performed in the blind-touch manner while the hands are substantially placed at the home position.

Figure 10B:
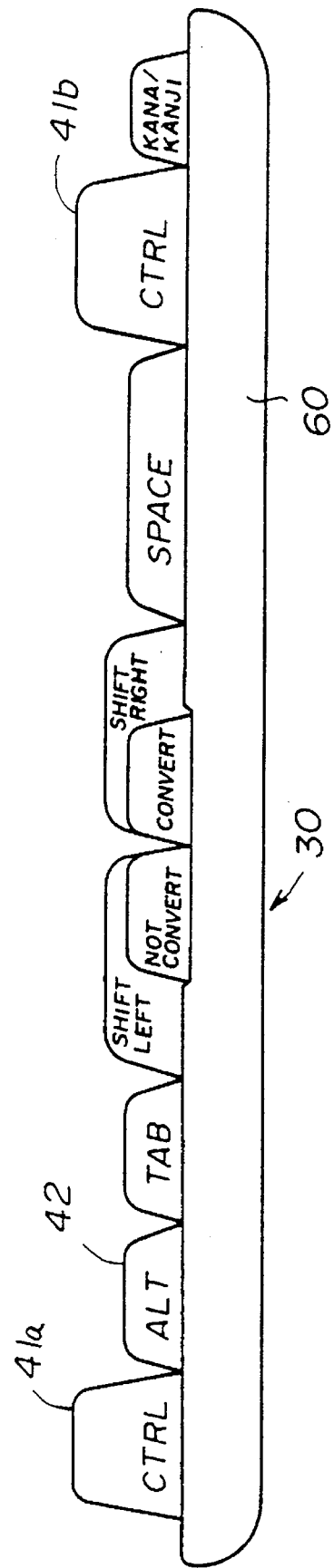
FIG. 10B is a front view of the keyboard shown in FIG. 10A.

FIGS. 10A and 10B illustrate a variation of the first embodiment of the present invention. In FIGS. 10A and 10B, parts that are the same as parts shown in the previously described figures are given the same reference numbers. The key arrangement shown in FIGS. 10A and 10B includes a control key ("CTRL") 41b provided at the lower right portion of the key arrangement. The space bar shown in FIG. 10A is shorter than that shown in FIG. 3A. The "CTRL" key 41b has a keytop having the same height as the keytop of the "CTRL" key 41a. More particularly, the keytop of the "CTRL" key 41b is higher than that of the space by at least the stroke length of the "CTRL" key. The "CTRL" key 41b is operable with the root portion or vicinity of the little finger of the right hand while the right hand is placed at the home position.

Figure 11A:
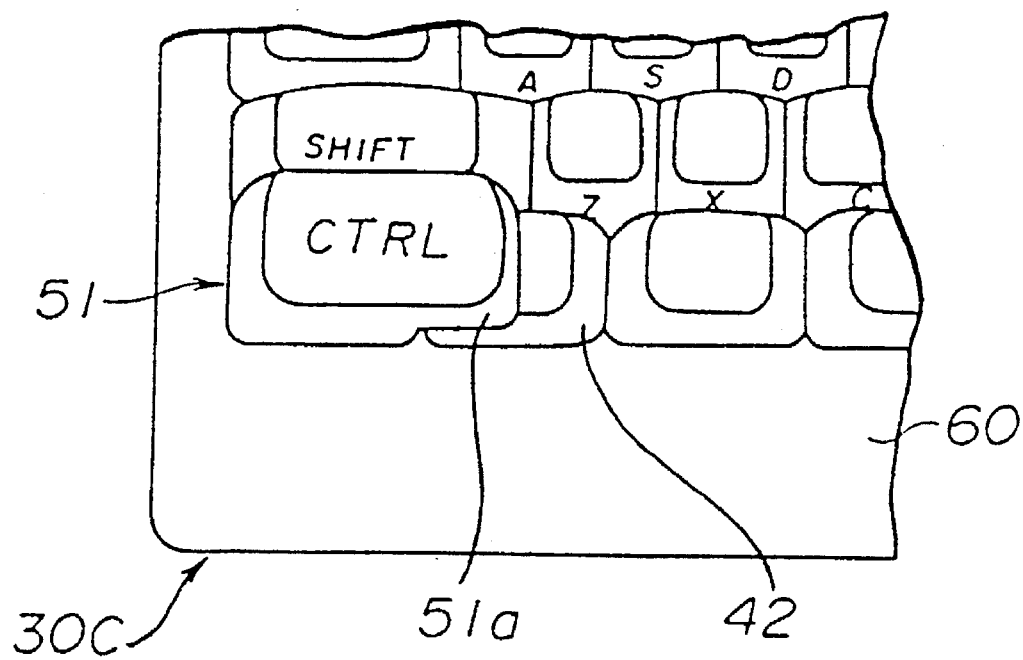
FIG. 11A is a top view of an essential part of a keyboard according to a second embodiment of the present invention.
Figure 11B:
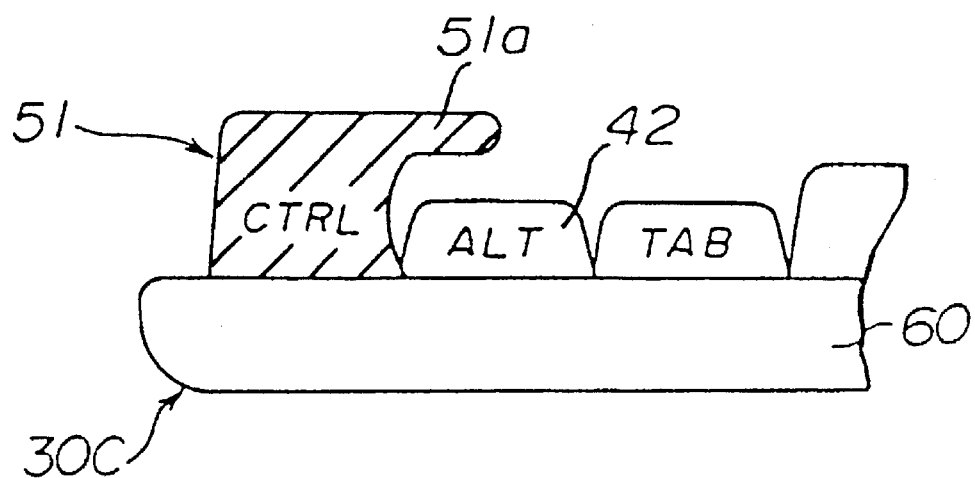
FIG. 11B is a front view of the keyboard shown in FIG. 11A.
Figure 12:
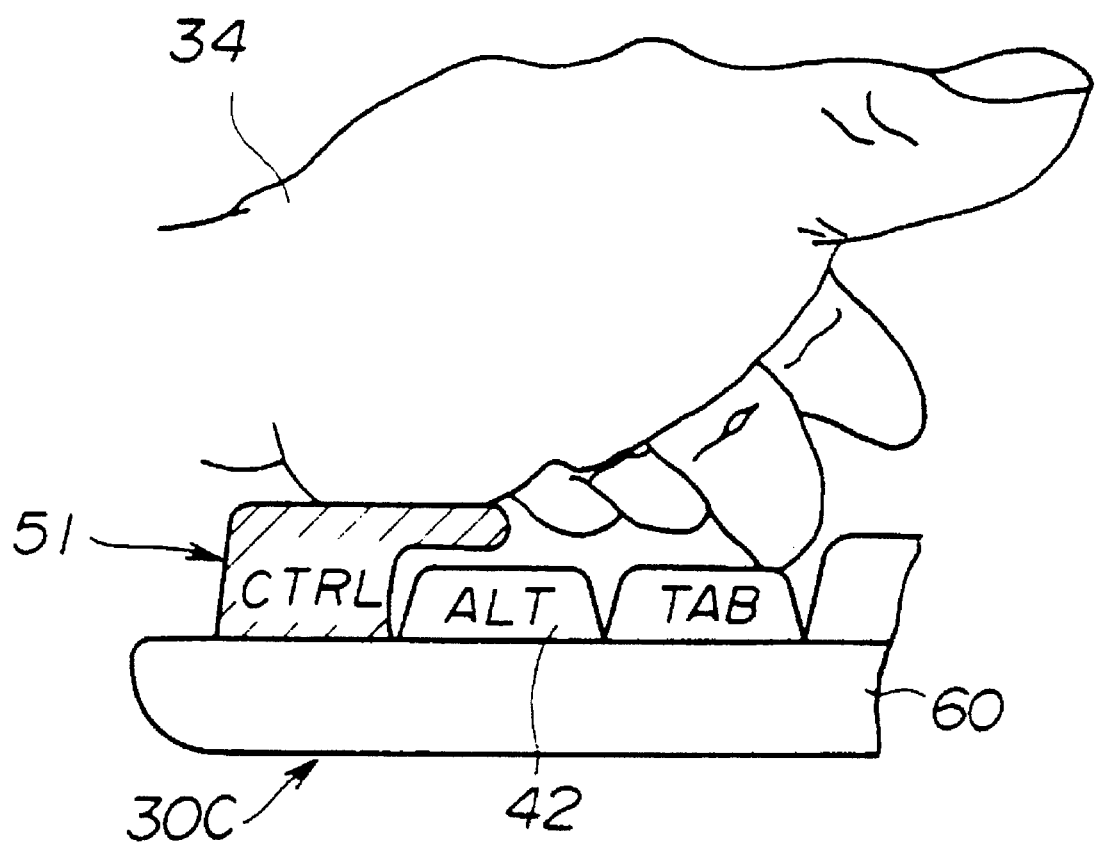
FIG. 12 is a front view illustrating how a "CTRL" key shown in FIGS. 11A and 11B is operated.

FIGS. 11A and 11B illustrate a keyboard 30C of a second embodiment of the present invention. A "CTRL" key 51 located at the lower left corner of the key arrangement has an overhang portion 51a, which partially extends above the keytop of the "ALT" key 42. In the case shown in FIGS. 11A and 11B, the overhang portion 51a covers half of the keytop of the "ALT" key 42. The "CTRL" key 51 is higher than the "ALT" key 42 by at least the sum of the stroke length of the "CTRL" key 51 and the thickness of the overhang portion 51a thereof. When the "CTRL" key 51 moves by the stroke length, it does not come into contact with the keytop of the "ALT" key 42. The "CTRL" key 51 has a keytop area wider than the "CTRL" key 41a. Hence, as shown in FIG. 12, the operationability of the "CTRL" key can be improved. The "ALT" key 42 cannot be prevented from being mistakenly operated. It will be noted that many application programs, such as editors, do not use the "ALT" key. Hence, there is substantially no problem arising from the presence of the overhang portion 51a. It is possible to provide a further "CTRL" key to the control key 51, at the lower right portion of the key, similar arrangement.

Figure 13A:
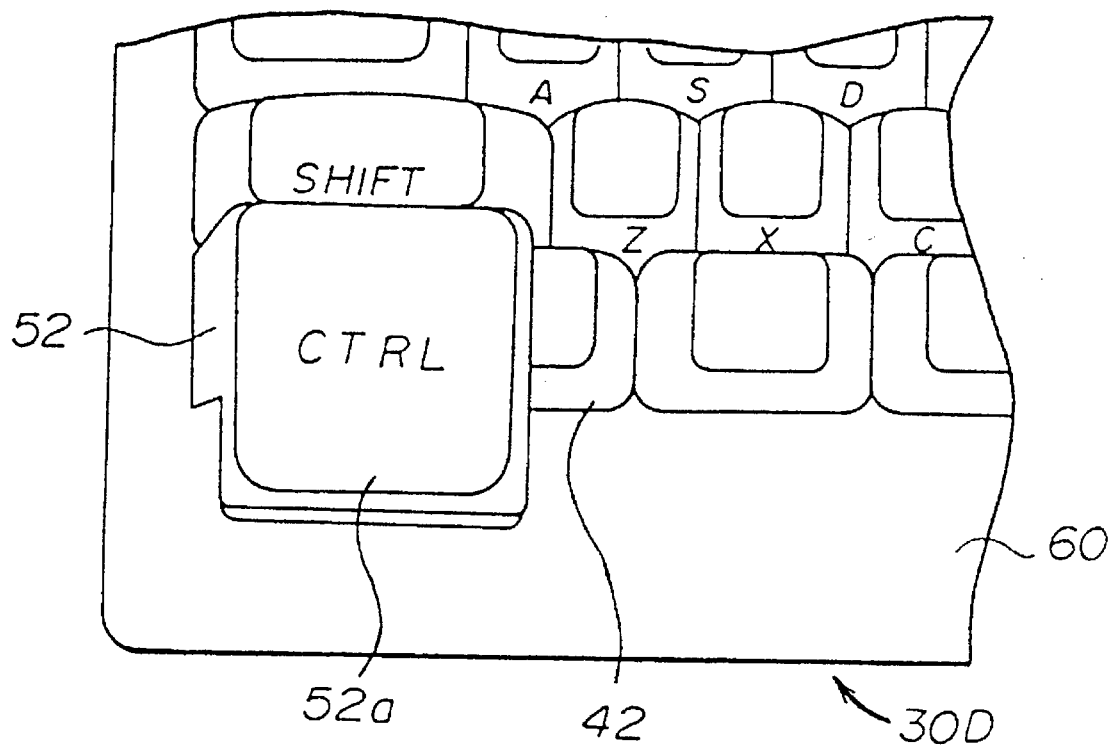
FIG. 13A is a top view of an essential part of a keyboard according to a third embodiment of the present invention.
Figure 13B:
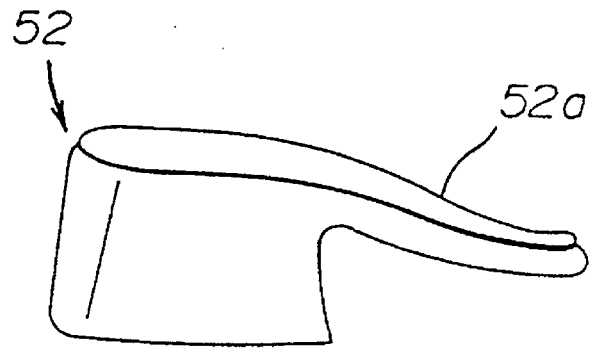
FIG. 13B is a front view of the keyboard shown in FIG. 13A.

FIGS. 13A and 13B illustrate a keyboard 30D according to a third embodiment of the present invention. A "CTRL" key 52 located at the lower left corner of the key arrangement has an overhang portion 52a, which partially extends above the keytop of the "ALT" key 42 and extends toward the operator. FIG. 13B is a left side view of the "CTRL" key 52. As shown in FIG. 13B, the overhang portion 52a has a downward slope extending toward the operator. Preferably, the slope of the overhang portion 52 is formed in a shape that matches the shape of the root portion or its vicinity of the little finger of the left hand. The operationability of the "CTRL" key 52 thereby is further improved.

Figure 14A:
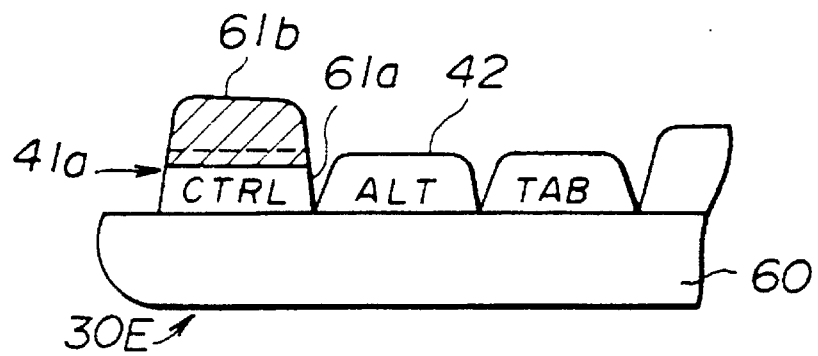
FIG. 14A is a front view of an essential part of a keyboard according to a fourth embodiment of the present invention.
Figure 14B:
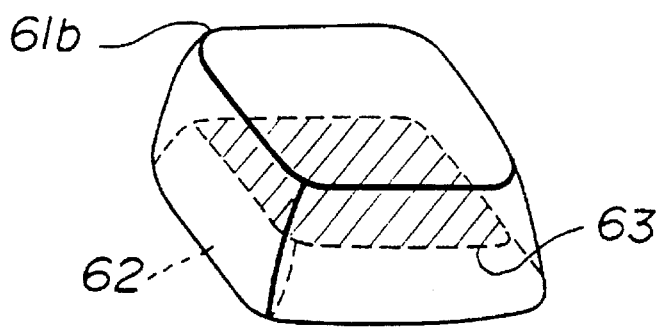
FIG. 14B is a perspective view of a keytop body according to the fourth embodiment of the present invention.
Figure 14C:
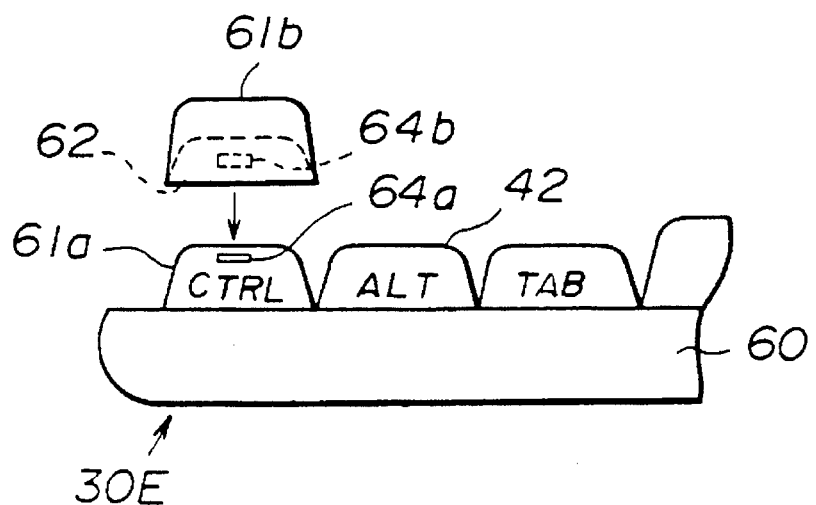
FIG. 14C is a front view illustrating how the keytop body shown in FIG. 14B is engaged with another keytop body.

FIGS. 14A, 14B and 14C illustrate a keyboard 30E according to a fourth embodiment of the present invention. The "CTRL" key 41a includes a first keytop body 61a and a second keytop (extension) body 61b. The first keytop body 61a is substantially the same height as the "CTRL" key shown in FIGS. 3A and 3B. That is, the first keytop body 61a, which is slidably supported by the keyboard body 60, is the same height as the keytop of "ALT" key 42. The second keytop extension body 61b is placed on the first keytop body 61a so that the second keytop body 61b covers the first keytop body 61a, as shown in FIG. 14A. The keytop of the "CTRL" key 41a, as thus defined by the top of the second keytop (extension) body 61b, is higher than the keytop of the "ALT" key 42 by at least the stroke length of the "CTRL" key 41a.

As shown in FIG. 14B, the second keytop body 61b has a recess area 62, which accommodates the first keytop body 61a. The recess area 62 of the second keytop body 61b has a tapered portion which matches the shape of the first keytop body 61a. The second keytop body 61b is fixed to the first keytop body 61a by pressing the second keytop body 61b against the first keytop body 61a. It is also possible to fasten the second keytop body 61b to the first keytop body 61a by an adhesive 63 coated on the bottom surface of the recess portion of the second keytop body 61b. The adhesive 63 may be an epoxy resin which functions to permanently fix the second keytop body 61b to the first keytop body 61a. It is also possible to use another adhesive, such as a two-sided adhesive tape, which detachably fastens the second keytop body 61b to the first keytop body 61a.

As shown in FIG. 14C, the second keytop body 61b can be securely fastened to the first keytop body 61a without the adhesive 63. The first keytop body 61a has a plurality of first engagement members 64a, such as projections, formed on sidewalls of the first keytop body 61a. For example, two first engagement members 64a are formed opposite to each other. The second keytop body 61b has a plurality of second engagement members 64b, such as recesses, formed on inner walls of the recess portion 62. When the second keytop body 61b is depressed against the first keytop body 61a, the first engagement members 64a engage the second engagement members 64b. The fourth embodiment of the present invention can be obtained without any modification of existing keyboards or with a slight modification thereof.

Figure 15A:
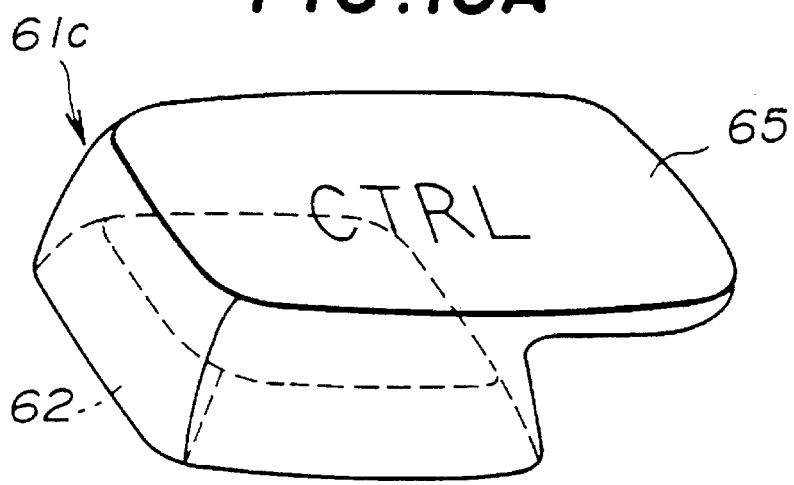
FIGS. 15A, 15B and 15C are perspective views of a keytop body according to a fifth embodiment of the present invention.
Figure 15B:
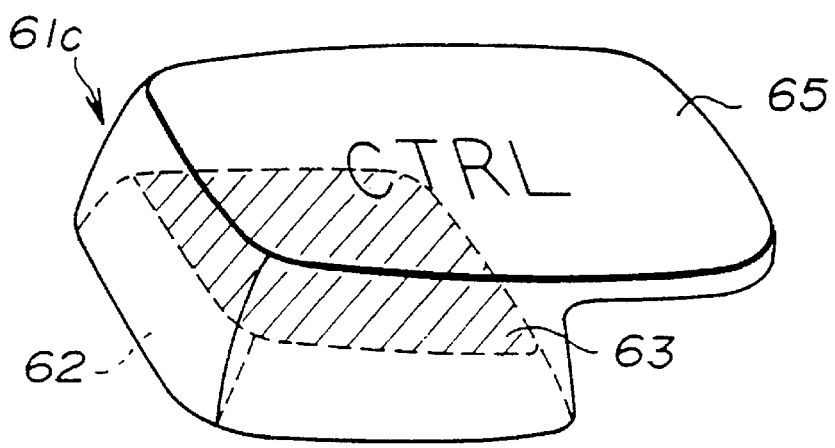
Figure 15C:
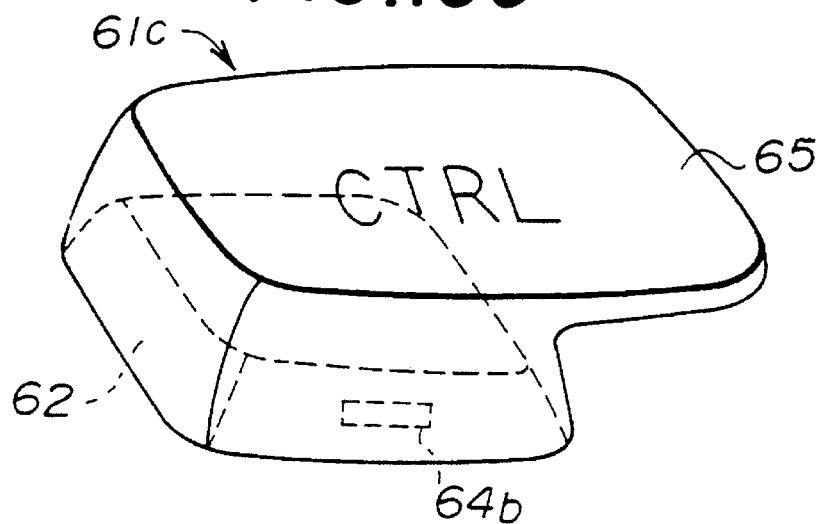

FIGS. 15A, 15B and 15C illustrate a keytop body 61c according to a fifth embodiment of the present invention. The keytop body 61c (hereinafter referred to as the second keytop body 61c) can be engaged with the first keytop body 61a shown in FIG. 14A. The second keytop body 61c has an overhang portion 65, which extends above approximately half of the adjacent key ("ALT" key in the arrangement shown in FIG. 14A). The second keytop 61c having the overhang portion 65 is integrally formed.

The second keytop body 61c can be fixed to the first keytop body 61a by pressing the second keytop body 61c against the first keytop body 61a. Alternatively, as shown in FIG. 15B, the second keytop body 61c can be fastened to the first keytop body 61a by the adhesive 63 coated on the bottom portion of the recess portion 62. Alternatively, the second keytop body 61c can be fastened to the first keytop body 61a by engaging the second engagement members 64b with the first engagement members 64a.

Figure 16:
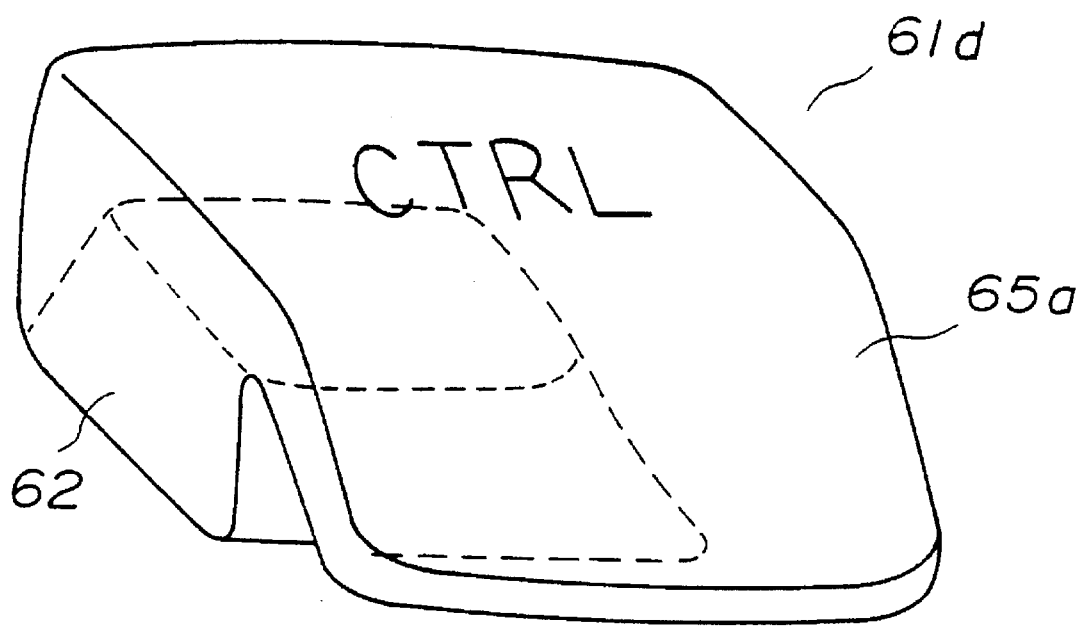
FIG. 16 is a perspective view of a keytop body according to a sixth embodiment of the present invention.

FIG. 16 is a perspective view a second keytop body 61d according to a sixth embodiment of the present invention. The second keytop body 61d, which engages the first keytop body 61a, has an overhang portion 65a, which covers half of the first keytop body 61a and extends toward the operator. The overhang portion 65a has a downward slope extending toward the operator. The second keytop body 61*d* can be fastened to the first keytop body 61*a* by pressing the second keytop body 61*d* against the first keytop body 61*a*. Alternatively, the second keytop body 61*d* can be fastened to the first keytop body 61*a* in the same manner as shown in FIG. 15B or 15C.

The aforementioned keytops can be formed of curing plastic, such as ABS (Acrylonitride-Butadiene Styrene), soft plastic, such as chloroethylene, a flexible member such as rubber or silicon rubber, or a metallic member, such as aluminum. It is also possible to form the second keytop body of two different materials rather than integrally form it with a single material. For example, the second keytop body is formed with soft plastic or rubber functioning as a buffer in order to reduce shocks when the "CTRL" key is operated.

It is possible to form a special key other than the "CTRL" key.

The present invention is not limited to the specifically disclosed embodiments, and variations and modifications may be made without departing from the scope of the present invention.

What is claimed is:

1. A keytop extension fastenable on a key of a keyboard having a plurality of keys arranged in plural rows in a first direction and plural columns in a second direction generally transverse to the first direction and including at least one special function key in a corresponding row, the special function key having an exterior configuration with an upper surface and having a stroke length, the keytop extension comprising:

a keytop extension body having upper and lower major surfaces and a recess, the recess extending upwardly from the lower major surface and into the keytop extension body and having an interior configuration mating at least an upper portion of the exterior configuration of the special key, the recess receiving the upper portion of the special key therewithin and thereby being detachably secured thereto; and the keytop extension body having a thickness such that, when detachably secured to the special key, the upper major surface of the keytop extension body is displaced above the upper surface of the special key by a distance which is at least as great as the stroke length of the special key.

2. A keytop extension as recited in claim 1 wherein the special key is adjacent a further key of the corresponding row, the further key having an upper surface, said keytop extension body further comprising an integral, overhang portion extending in the first direction and partially over the upper surface of the adjacent key.

3. A keytop extension as recited in claim 2, wherein:

the adjacent key has a width dimension in the first direction; and the integral, overhang portion extends in the first direction over approximately one-half of the width dimension of the upper surface of the adjacent key.

4. An keytop extension as recited in claim 2, wherein:

the integral, overhang portion additionally extends in the second direction, toward a position of an operator of the keyboard.

5. A keytop extension as recited in claim 4, wherein the second overhang portion, relatively to a horizontal plane, extends at a downward angle toward the position of an operator of the keyboard.

6. A keytop extension as recited claim 1, further comprising:

a layer of adhesive disposed between and engaging the upper main surface of the special key and a mating surface portion of the recess of the keytop extension.

7. A keytop extension as recited in claim 1, further comprising:

first and second engagement members respectively on the upper portion of the special function key and on a corresponding portion of the recess; and one of the first and second engagement members comprises a resilient material which resiliently engages the other thereof.

8. A keytop extension as recited in claim 1, wherein the keytop extension body is made of a resilient material and thereby receives and engages, resiliently, the upper portion of the special function key within the recess thereof.

* * * * *

UNITED STATES PATENT AND TRADEMARK OFFICE
CERTIFICATE OF CORRECTION

PATENT NO. : 5,560,724
DATED : Oct. 1, 1996
INVENTOR(S) : IWASA et al.

It is certified that error appears in the above-indentified patent and that said Letters Patent is hereby corrected as shown below:

TITLE PAGE: [56] References Cited, under "FOREIGN PATENT DOCUMENTS", after the third reference, insert --9110010 12/1991 Germany--; and
in the last reference, change "United Kingdom" to --Germany--.

Col. 2, line 38, change "thumb s" to --thumbs--;
line 44, delete "increase".

Col. 3, line 8, change "can" to --are--;
line 9, change "writes are" to --wrists can--.

Col. 5, line 28, after "space" insert --bar--;
line 30, after "or" insert --its--;
line 52, after "key" insert --, similar--;
line 53, delete ", similar--.

Col. 8, line 3 (claim 2, line 1), after "1" insert --,--;
line 16 (claim 4, line 1), change "An" to --A--;
line 23 (claim 6, line 1), after "recited" insert --in--.

Signed and Sealed this

Twenty-ninth Day of April, 1997

Attest:

BRUCE LEHMAN

*Attesting Officer*    Commissioner of Patents and Trademarks